United States Patent
Lee et al.

(10) Patent No.: US 7,737,957 B2
(45) Date of Patent: Jun. 15, 2010

(54) TOUCH SENSITIVE DISPLAY DEVICE AND DRIVING APPARATUS AND METHOD THEREOF

(75) Inventors: Joo-Hyung Lee, Gwacheon-si (KR); Kee-Han Uh, Yongin-si (KR); Jong-Woung Park, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 936 days.

(21) Appl. No.: 11/533,910

(22) Filed: Sep. 21, 2006

(65) Prior Publication Data

US 2007/0063991 A1 Mar. 22, 2007

(30) Foreign Application Priority Data

Sep. 21, 2005 (KR) .................. 10-2005-0087796

(51) Int. Cl.
*G09G 5/00* (2006.01)
(52) U.S. Cl. .................................. 345/173; 178/18.01
(58) Field of Classification Search ......... 345/156–158, 345/168, 169, 173–179, 211; 178/18.01, 178/18.03, 18.05–18.07
See application file for complete search history.

(56) References Cited

U.S. PATENT DOCUMENTS

| | | | |
|---|---|---|---|
| 5,621,437 A * | 4/1997 | Jeong | ........................... 345/173 |
| 6,054,979 A | 4/2000 | Sellers | |
| 6,469,695 B1 | 10/2002 | White | |
| 2003/0122798 A1* | 7/2003 | Shin | ............................ 345/173 |
| 2005/0134751 A1 | 6/2005 | Abileah et al. | |

FOREIGN PATENT DOCUMENTS

| | | |
|---|---|---|
| CN | 1527274 | 9/2004 |
| CN | 1577383 | 2/2005 |
| JP | 08249121 | 9/1996 |
| JP | 08305496 | 11/1996 |
| JP | 10039987 | 2/1998 |
| JP | 2001306255 | 11/2001 |
| JP | 2002323942 | 11/2002 |
| JP | 2003015779 | 1/2003 |
| KR | 1019970008515 | 5/1997 |
| KR | 1020040059035 | 7/2004 |
| KR | 100465026 | 12/2004 |

* cited by examiner

*Primary Examiner*—Regina Liang
(74) *Attorney, Agent, or Firm*—Cantor Colburn LLP

(57) ABSTRACT

A display device includes a display panel, a plurality of pixels formed on the display panel, a plurality of sensing units formed on the display panel and generating sensor output signals in response to a touch exerted on the display panel, a sensing signal processor receiving and processing an analog sensor data signal originated from the sensor output signals to generate a digital sensor data signal, a first touch-determination unit detecting whether a touch exists based on the digital sensor data signal for a plurality of frames, and operating in a power saving mode, and a second touch-determination unit detecting whether and where a touch exists based on the digital sensor data signal for the plurality of frames, and operating in a normal mode. The display device includes hardwired logic units for detecting the touch, it detects the touch using the hardwired logic units in the power saving mode and converts the operation mode to the normal mode when the touch is detected, thus reducing power consumption.

30 Claims, 10 Drawing Sheets

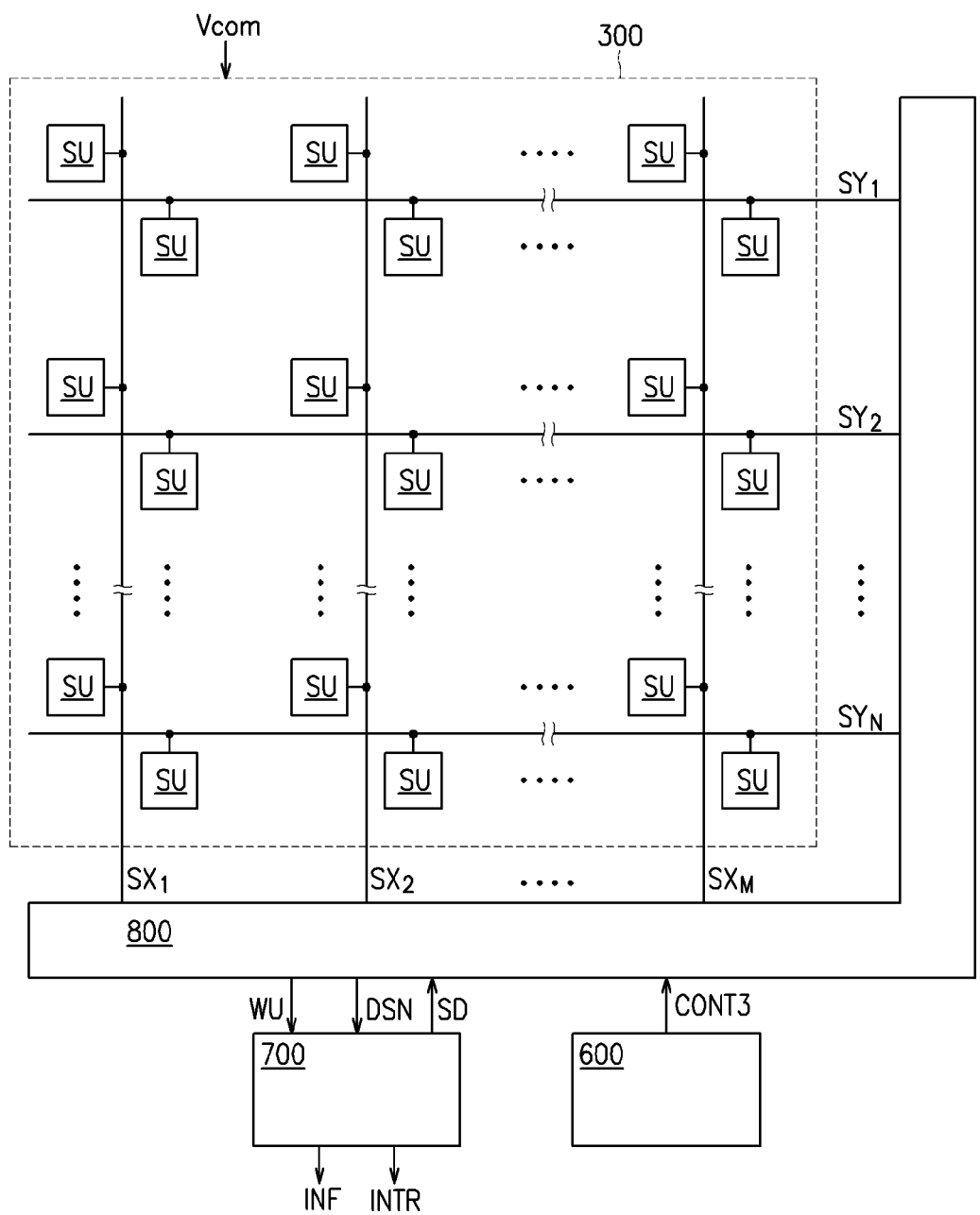

TOUCH SENSITIVE DISPLAY DEVICE AND DRIVING APPARATUS AND METHOD THEREOF

This application claims priority to Korean Patent Application No. 10-2005-0087796, filed on Sep. 21, 2005, and all the benefits accruing therefrom under 35 U.S.C. §119, the contents of which in its entirety are herein incorporated by reference.

BACKGROUND OF THE INVENTION (a) Field of the Invention

The present invention relates to a touch sensitive display device, and a driving apparatus and method thereof, and more particularly to a display device including hardwired logic units for detecting a touch using the hardwired logic units in a power saving mode, and converts the operation mode to a normal mode when the touch is detected to reduce power consumption.

(b) Description of Related Art

A liquid crystal display ("LCD") among display devices includes a pair of panels provided with pixel electrodes and a common electrode, respectively. A liquid crystal layer with dielectric anisotropy is interposed between the panels. The pixel electrodes are arranged in a matrix and connected to respective switching elements such as thin film transistors ("TFTs") such that they receive image data voltages row by row. The common electrode covers the entire surface of one of the two panels, and is supplied with a common voltage. A pixel electrode and corresponding portions of the common electrode as well as corresponding portions of the liquid crystal layer form a liquid crystal capacitor that, along with a respective switching element connected thereto, is a basic element of a pixel.

An LCD generates electric fields by applying voltages to pixel electrodes and a common electrode and varies the strength of the electric fields to adjust the transmittance of light passing through a liquid crystal layer, thereby displaying images.

A touch screen panel is an apparatus on which a finger or a stylus is touched to write characters, to draw pictures, or to instruct a device such as a computer to execute instructions by using icons displayed on the touch screen panel. The touch screen panel has its own mechanism to determine whether and where a touch exists, and the touch screen panel is usually attached on a display device such as an LCD. However, an LCD provided with a touch screen panel has many disadvantages. The disadvantages include a high manufacturing cost due to the cost of the touch screen panel, low productivity due to a step for attaching the touch screen panel to the LCD, a reduction of the luminance of the LCD and an increase in the thickness of the LCD, for example.

Sensors that are incorporated into pixels in an LCD instead of using a separate touch screen panel have been developed. A sensor senses a variation of light incident on a panel caused by a user's finger, for example, to inform the LCD whether the user's finger touches the screen and where the touch occurs.

However, a large amount of power is consumed to read sensor data signals and obtain touch information from the sensor data signals. Further, power consumption of a middle-sized or small-sized LCD used in portable devices such as a cell phone, a personal digital assistant PDA, etc., needs to be minimized for carrying portable devices for extended periods without requiring recharging of the portable devices.

BRIEF SUMMARY OF THE INVENTION

A display device according to an exemplary embodiment of the present invention includes a display panel, a plurality of pixels formed on the display panel, a plurality of sensing units formed on the display panel and generating sensor output signals in response to a touch exerted on the display panel, a sensing signal processor receiving and processing an analog sensor data signal originated from the sensor output signals to generate a digital sensor data signal, a first touch-determination unit detecting whether a touch exists based on the digital sensor data signal for a plurality of frames, and operating in a power saving mode, and a second touch-determination unit detecting whether and where a touch exists based on the digital sensor data signal for the plurality of frames, and operating in a normal mode.

The first touch-determination unit may include hardwired logic units.

The first touch-determination unit may be cut off from a power in the normal mode.

The first touch-determination unit may include an averaging unit averaging the digital sensor data signal for the plurality of frames, a difference data generator generating a difference data based on the averaged digital sensor data signal, and a comparator comparing the difference data with a reference data.

The second touch-determination unit may include a first memory storing program codes, a second memory storing the digital sensor data signal for the plurality of frames, and a main processor operating based on the program codes read from the first memory, reading the digital sensor data signal for the plurality of frames from the second memory, and determining whether and where the touch exists based on the read digital sensor data signal.

The first memory and the main processor may be cut off from a power in the power saving mode.

The sensing signal processor may include an amplifier amplifying the analog sensor data signal, and an analog-to-digital converter analog-to-digital converting the amplified analog sensor data signal to generate the digital sensor data signal.

The amplifier may have a plurality of channels, and at least one of the channels may be cut off from the power in the power saving mode.

The display device may further include a frame memory storing the digital sensor data signal for a plurality of frames.

The sensing signal processor may include the first touch-determination unit and is implemented in a single IC.

The second touch-determination unit may include the first touch-determination unit and may be implemented in a single IC.

The sensing signal processor and the first and second touch-determination units may be implemented in a single IC.

A apparatus for driving a display device including a display panel and a plurality of sensing units generating sensor output signals in response to a touch exerted on the display panel, according to another exemplary embodiment of the present invention, includes a sensing signal processor receiving and processing an analog sensor data signal originated from the sensor output signals to generate a digital sensor data signal, a first touch-determination unit detecting whether a touch exists based on the digital sensor data signal for a plurality of frames and operating in a power saving mode, and a second touch-determination unit detecting whether and where a touch exists based on the digital sensor data signal for the plurality of frames and operating in a normal mode.

A method of driving a display device including a display panel, a plurality of sensing units generating sensor output signals in response to a touch exerted on the display panel, and first and second touch-determination units determining the existence of a touch based on the sensor output signals, according to another embodiment of the present invention, includes generating a digital sensor data signal based on the sensor output signals, determining whether a touch exists based on the digital sensor data signal in the first touch-determination unit, cutting the first touch-determination unit off from a power and supplying the power to the second touch-determination unit when it is determined by the first touch determination unit that a touch exists, determining whether a touch exists based on the digital sensor data signal in the second touch-determination unit, and supplying the power to the first touch-determination unit and cutting the second touch-determination unit off from the power after a predetermined time from a time when it is determined by the second touch determination unit that there is no touch.

The determination in the first and second touch determination units may include averaging the digital sensor data signal for the plurality of frames, generating a difference data based on the averaged digital sensor data signal, comparing the difference data with a reference data, and determining that a touch occurs when the difference data is equal to or greater than the reference data.

BRIEF DESCRIPTION OF THE DRAWINGS

The accompanying drawings briefly described below illustrate exemplary embodiments of the present invention and, together with the detailed description, serve to explain the principles of the present invention in which:

FIG. 3 is a block diagram of the LCD of FIG. 1 according to the exemplary embodiment of the present invention from the standpoint of a sensing unit of the LCD;

DETAILED DESCRIPTION OF THE INVENTION

Figure 1:
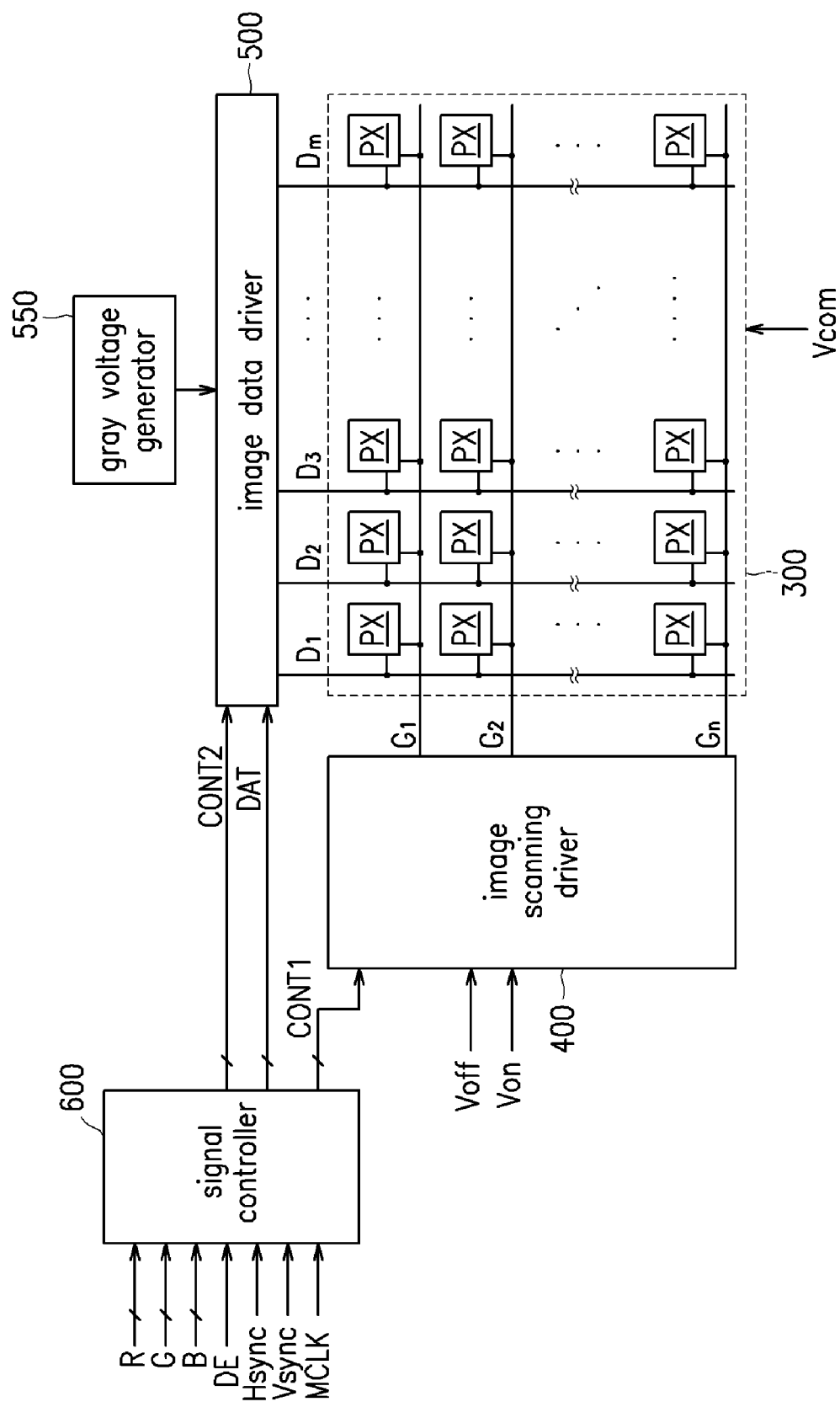
FIG. 1 is a block diagram of an LCD according to an exemplary embodiment of the present invention.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these exemplary embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, exemplary embodiments of the present invention should not be construed as being limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

A liquid crystal display as an example of a display device according to an exemplary embodiment of the present invention will now be described with reference to FIG. 1 to FIG. 5B.

Figure 2:
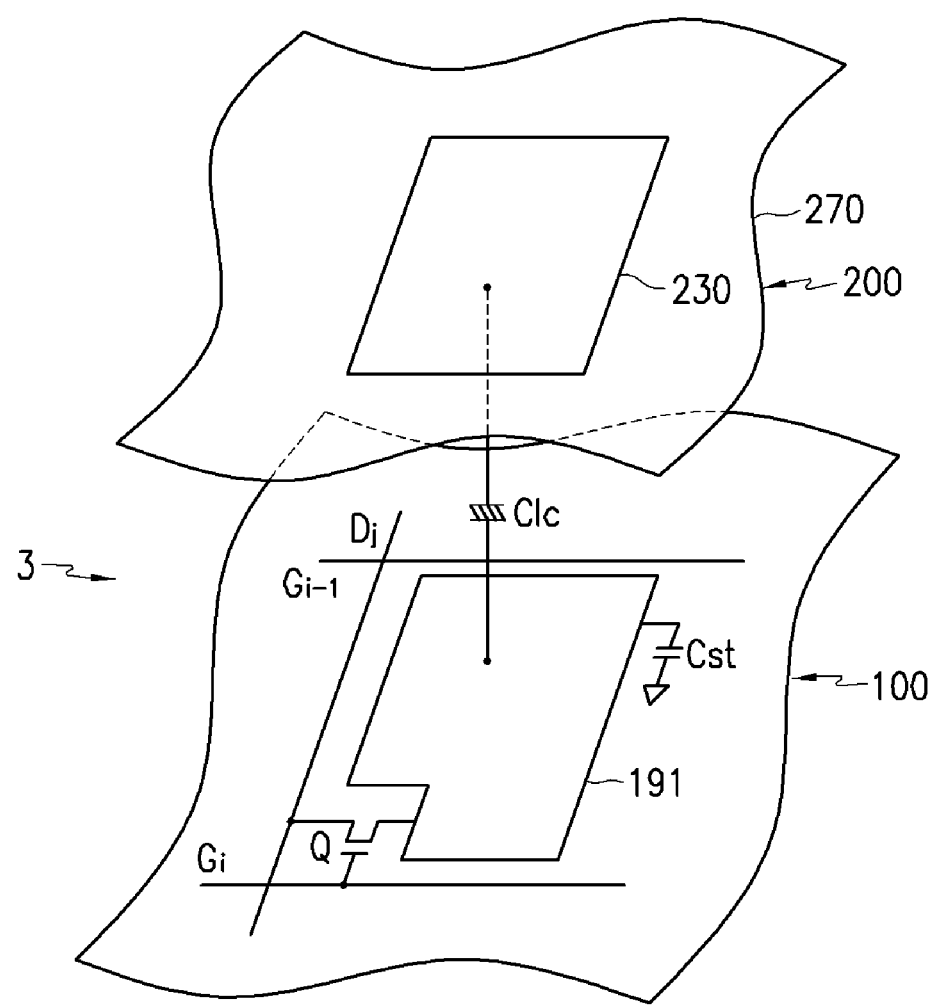
FIG. 2 is an equivalent circuit schematic diagram of a pixel of the LCD of FIG. according to the embodiment of the present invention.
Figure 4A:
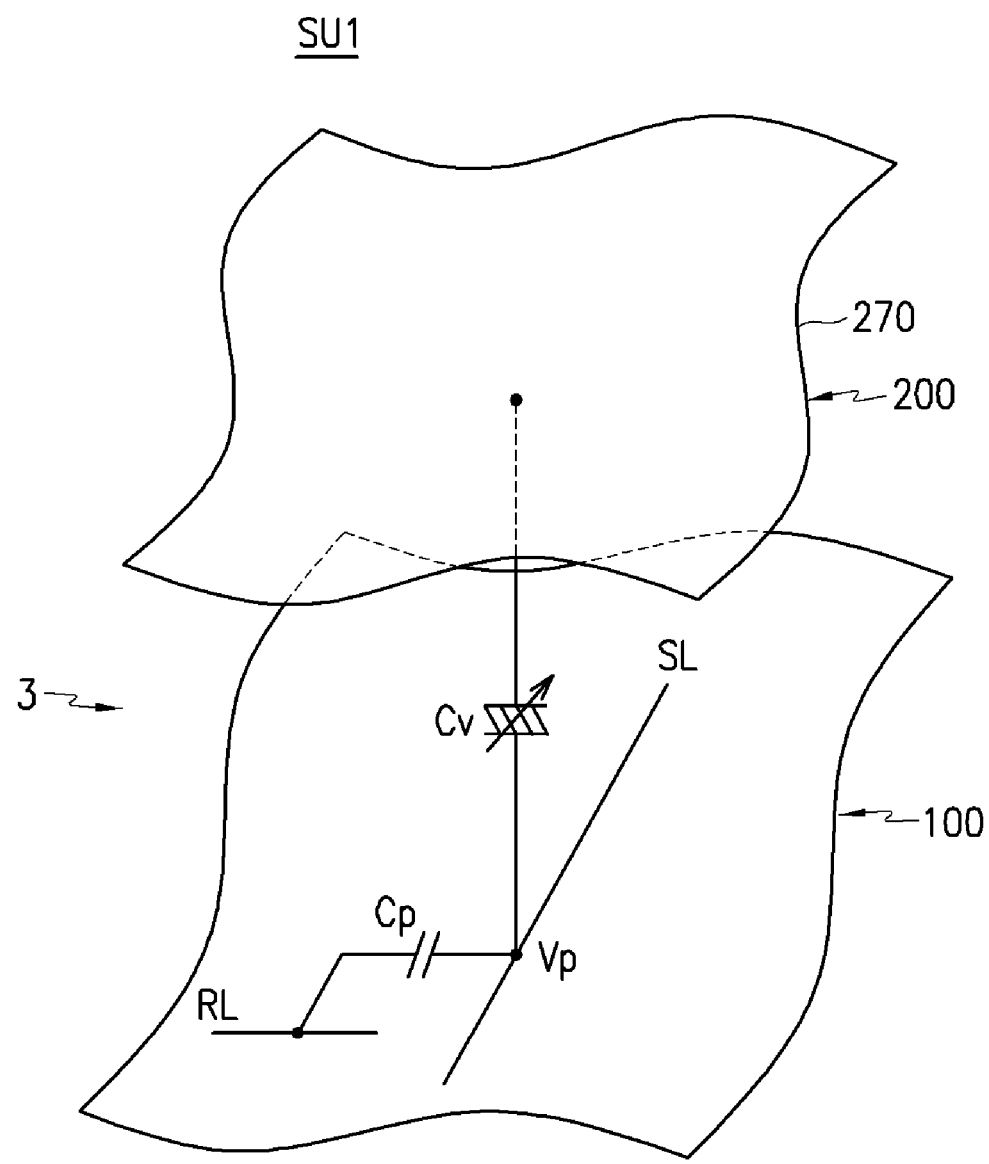
FIG. 4A and FIG. 4B are equivalent circuit schematic diagrams of a sensing unit of the LCD according to exemplary embodiments of the present invention.
Figure 4B:
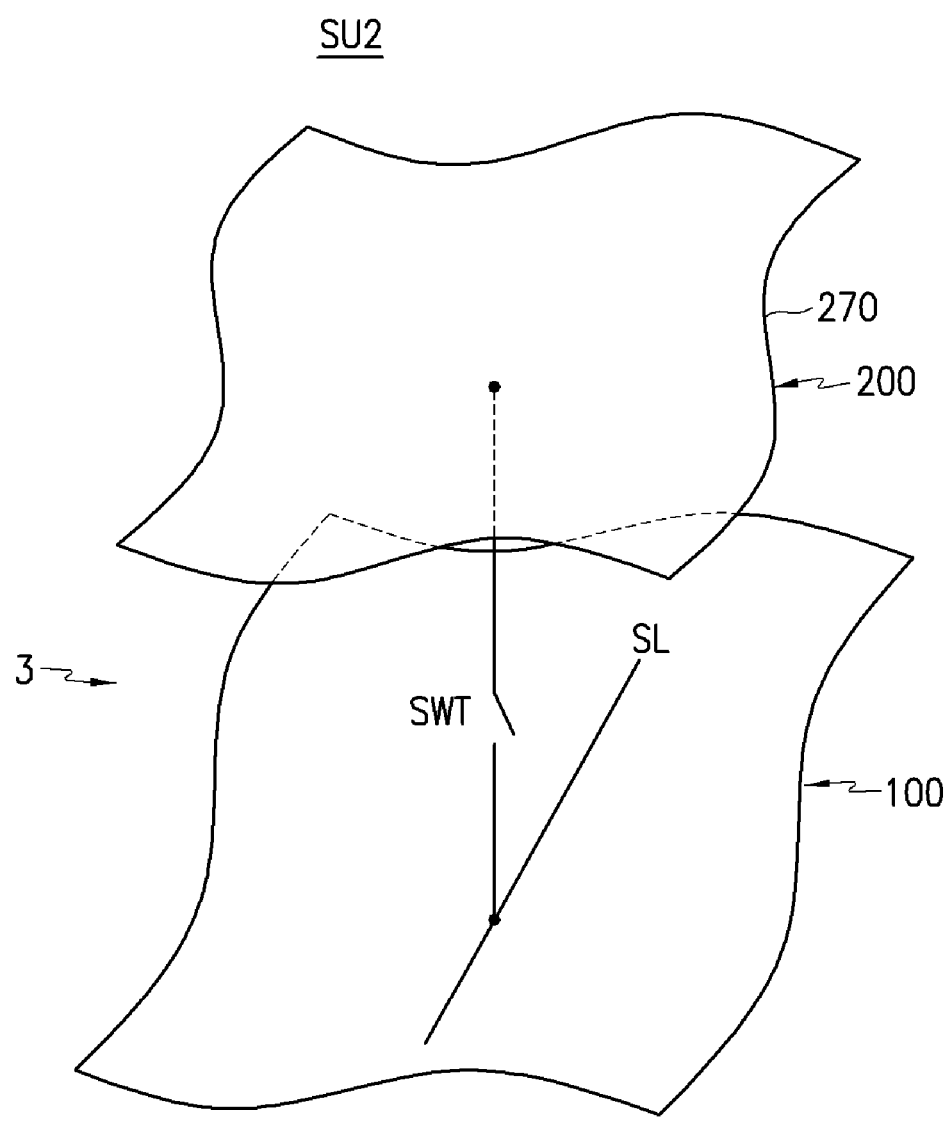
Figure 5A:
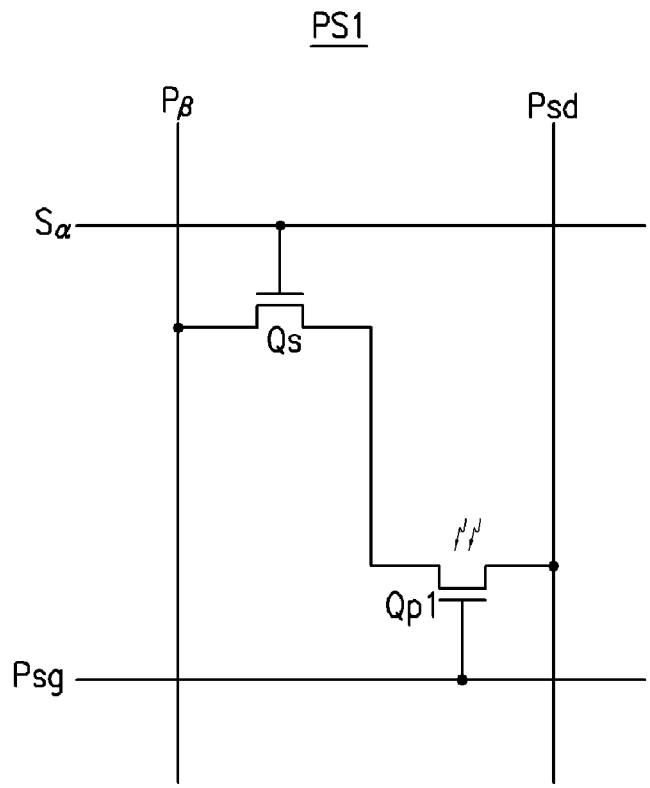
FIG. 5A and FIG. 5B are equivalent circuit schematic diagrams of a photosensor of the LCD according to exemplary embodiments of the present invention.
Figure 5B:
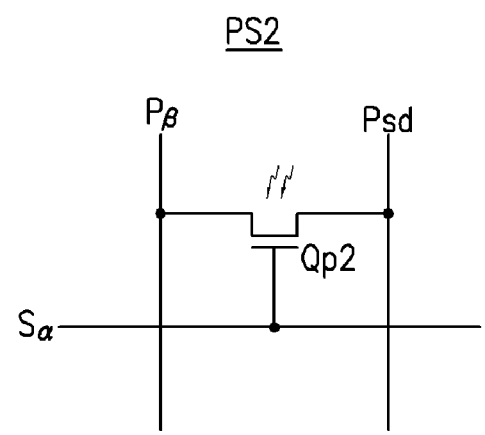

FIG. 1 is a block diagram of an LCD according to an exemplary embodiment of the present invention, and FIG. 2 is an equivalent circuit schematic diagram of a pixel of the LCD of FIG. 1. FIG. 3 is a block diagram of the LCD of FIG. 1 from the standpoint of a sensing unit of the LCD, and FIG. 4A and FIG. 4B are equivalent circuit schematic diagrams of a sensing unit of the LCD according to exemplary embodiments of the present invention. FIG. 5A and FIG. 5B are equivalent circuit schematic diagrams of a photosensor of the LCD according to exemplary embodiments of the present invention.

Referring to FIG. 1 and FIG. 3, an LCD according to an exemplary embodiment includes a liquid crystal ("LC") panel assembly 300, an image scanning driver 400, an image data driver 500 and a sensing signal processor 800 that are each coupled with the panel assembly 300, a gray voltage generator 550 coupled with the image data driver 500, a touch-determination unit 700 coupled with the sensing signal processor 800, and a signal controller 600 for controlling the above elements.

Referring to FIG. 1 to FIG. 4B, the LC panel assembly 300 includes a plurality of pixels PX arranged substantially in a matrix and connected to a plurality of display signal lines $G_1$-$G_n$ and $G_1$-$D_m$, and a plurality of sensing units SU arranged substantially in a matrix and connected to sensor signal lines $SY_1$-$SY_N$, $SX_1$-$SX_M$, and RL. Referring to FIG. 2, the LC panel assembly 300 includes a thin film transistor array panel 100 and a common electrode panel 200 facing each other, and a liquid crystal ("LC") layer 3 interposed therebetween.

The display signal lines $G_1$-$G_n$ and $D_1$-$D_m$ include a plurality of image scanning lines transmitting image scanning signals and a plurality of image data lines $D_1$-$D_m$ transmitting image data signals, and the sensor signal lines $SY_1$-$SY_N$, $SX_1$-$SX_M$, and RL include a plurality of row sensor data lines $SY_1$-$SY_N$ and a plurality of column sensor data lines $SX_1$-$SX_M$ transmitting sensor data signals and a plurality of reference voltage lines RL transmitting reference voltages. In alternative exemplary embodiments, the reference voltage line RL may be omitted.

The display signal lines $G_1$-$G_n$ and the row sensor data lines $SY_1$-$SY_N$ extend substantially in a row direction and substantially parallel to each other, and the display signal lines $D_1$-$D_m$ and the column sensor data lines $SX_1$-$SX_M$ extend substantially in a column direction and substantially parallel to each other. The reference voltage line RL extends substantially in a row direction or a column direction.

Each pixel PX, for example, a pixel in the i-th row (wherein "i" is an integer and i=1, 2, . . . , n) and the j-th column (wherein "j" is an integer and j=1, 2, . . . , m) includes a switching element Q connected to the display signal lines $G_i$ and $D_j$, and a liquid crystal capacitor Clc and a storage capacitor Cst connected to the switching element Q. However, the storage capacitor Cst may be omitted in alternative exemplary embodiments.

The switching element Q is disposed on the thin film transistor array panel 100 and has three terminals, i.e., a control terminal connected to the image scanning line $G_i$, an input terminal connected to the image data line $D_j$, and an output terminal connected to the LC capacitor Clc and the storage capacitor Cst. The thin film transistor includes amorphous silicon or poly crystalline silicon.

The liquid crystal capacitor Clc includes a pixel electrode 191 disposed on thin film transistor array panel 100 and a common electrode 270 disposed on the common electrode panel 200 as two terminals. The LC layer 3 disposed between the two electrodes 190 and 270 functions as a dielectric of the LC capacitor Clc. The pixel electrode 191 connected to the switching element Q and the common electrode 270 is supplied with a common voltage Vcom and covers an entire surface of the common electrode panel 200. Unlike FIG. 2, the common electrode 270 may be provided on the thin film transistor array panel 100, and at least one of the electrodes 191 and 270 may have a shape of a bar or a stripe.

The storage capacitor Cst is an auxiliary capacitor for the LC capacitor Clc. The storage capacitor Cst includes the pixel electrode 191 and a separate signal line (not shown), which is provided on the thin film transistor array panel 100. The storage capacitor Cst overlaps the pixel electrode 191 via an insulator interposed therebetween, and is supplied with a predetermined voltage such as the common voltage Vcom. Alternatively, the storage capacitor Cst includes the pixel electrode 191 and an adjacent gate line called a previous gate line, which overlaps the pixel electrode 190 via an insulator.

For color display, each pixel uniquely represents one of primary colors (i.e., spatial division) or each pixel sequentially represents the primary colors in turn (i.e., temporal division) such that spatial or temporal sums of the primary colors are recognized as a desired color. An example of a set of the primary colors includes red, green and blue. FIG. 2 shows an example of the spatial division in which each pixel PX includes a color filter 230 representing one of the primary colors in an area of the common electrode panel 200 facing the pixel electrode 191. Alternatively, the color filter 230 is provided on or under the pixel electrode 191 on the thin film transistor array panel 100.

At least one polarizer (not shown) is provided at the outside of the LC panel assembly 300.

The sensing unit SU may have a structure as shown in FIG. 4A (i.e., SU1) or FIG. 4B (SU2).

The sensing unit SU1 as shown in FIG. 4A includes a variable capacitor Cv connected to a row or column data line (hereinafter, referred to as a sensor data line SL), and a reference capacitor Cp connected to the sensor data line SL and a reference voltage line RL.

The reference capacitor Cp includes the reference voltage line RL and the sensor data line SL, which overlaps the reference voltage line RL via an insulator.

The variable capacitor Cv includes the sensor data line SL disposed on the thin film transistor array panel 100 and the common electrode 270 disposed on the common electrode panel 200 as two terminals. The LC layer 3 disposed between the two terminals SL and 270 functions as a dielectric of the variable capacitor Cv. A capacitance of the variable capacitor Cv is varied depending on an external impulse provided on the liquid crystal panel assembly 300 such as a user's contact (e.g., touch), etc. For example, the external impulse is a contact pressure. When the common electrode panel 200 receives contact pressure, the distance between the terminals (i.e., sensor data line SL and the common electrode 270) is changed, and accordingly the capacitance of the variable capacitor Cv is changed. A junction voltage Vp between the reference capacitor Cp and the variable capacitor Cv is varied depending on the capacitance of the variable capacitor Cv. The junction voltage Vp is a data signal that is transmitted through the sensor data line SL, and represents whether a touch exists.

The sensing unit SU2 as shown in FIG. 4B includes a switch SWT connected to a sensor data line SL.

The switch SWT includes the sensor data line SL and the common electrode 270 as two terminals. At least one of the two terminals projects, and therefore the two terminals are physically and electrically connected to each other by a user's touch. Accordingly, the common voltage Vcom is transmitted from the common electrode 270 to the sensor data line SL as a sensor data signal. The configuration shown in FIG. 4B does not require the reference voltage line RL shown in FIG. 4A.

The sensor data signal transmitted through the row sensor data line $SY_1$-$SY_N$ is analyzed to determine a longitudinal position (i.e., a Y coordinate) of the touch point, and the sensor data signal transmitted through the column sensor data line $SX_1$-$SX_M$ is analyzed to determine a transverse or horizontal position (i.e., an X coordinate) of the touch point.

The sensing unit SU is disposed between two pixels PX adjacent to each other.

The density of pairs of the sensing units SU, each pair of the sensing units SU connected to the row and the column sensor data line $SY_1$-$SY_N$ and $SX_1$-$SX_M$, respectively, and disposed on the adjacent region to intersection thereof, may be approximately a quarter of the density of dots. Here, a dot, which is a unit of the resolution of the LCD, includes a set of three pixels PX disposed adjacent to one another and representing three primary colors such as red, green and blue. However, a dot may include four or more pixels PX, and in this case the pixel PX may represent one of the three primary colors and a white color.

When the density of pairs of the sensing units SU is about a quarter of the resolution of the LCD (i.e., the density of the dots), for example, the density of pairs of the sensing units SU in a row may be a half of the density of the dots in a row, and the density of pairs of the sensing units SU in a column may be a half of the density of the dots in a column. In this case, there may be a row and a column of pixels having no sensing unit SU.

The LCD having the density of the sensing units and the density of the dots as described above may be applied to a field of precision such as character recognition. The resolution of the sensing units may be changed.

In the meantime, referring to FIG. 5A and FIG. 5B, the LC panel assembly 300 may further include a plurality of sensing signal lines $S_\alpha$, $P_\beta$, Psg and Psd ($\alpha$, $\beta$ are natural numbers) and a plurality of photosensors connected to the sensing signal lines $S_\alpha$, $P_\beta$, Psg and Psd and arranged substantially in a matrix.

The plurality of sensing signal lines $S_\alpha$, $P_\beta$, Psg and Psd include a plurality of sensor scanning lines $S_\alpha$ transmitting sensor scanning signals, a plurality of sensor data lines $P_\beta$ transmitting sensor data signals, a plurality of control voltage lines Psg transmitting a sensor control voltage and a plurality of input voltage lines Psd transmitting a sensor input voltage.

The sensor scanning lines $S_\alpha$ and the control voltage lines Psg extend substantially in a row direction and substantially parallel to each other, while the sensor data lines $P_\beta$ and the input voltage lines Psd extend substantially in a column direction and substantially parallel to each other.

The photosensor PS may have a structure shown in FIG. 5A (PS1) or FIG. 5B (PS2).

The photosensor PS1 shown in FIG. 5A includes a sensing element Qp1 connected to the signal lines Psg and Psd, and a switching element Qs connected to the signal lines $S_\alpha$ and $P_\beta$.

The sensing element Qp1 has three terminals, i.e., a control terminal connected to the control voltage line Psg, an input terminal connected to the input voltage line Psd, and an output terminal connected to the switching element Qs. The sensing element Qp includes a photoelectric material that generates a photocurrent upon receipt of light. An example of the sensing element Qp1 is a thin film transistor having an amorphous silicon or polysilicon channel that can generate a photocurrent. The sensor control voltage applied to the control terminal of the sensing element Qp1 is sufficiently low or sufficiently high to keep the sensing element Qp1 in an off state without incident light. The sensor input voltage applied to the input terminal of the sensing element Qp1 is sufficiently high to keep the photocurrent flowing toward a switching element Qs.

The switching element Qs also has three terminals, i.e., a control terminal connected to the sensor scanning line $S_\alpha$ an output terminal connected to the sensor data line $P_\beta$ and an input terminal connected to the sensing element Qp1. The switching element Qs outputs a sensor output signal to the sensor data line $P_\beta$ in response to the sensor scanning signal from the sensor scanning line $S_\alpha$. The sensor output signal may be the photocurrent from the sensing element Qp1.

The photosensor PS2 shown in FIG. 5B includes only a sensing element Qp2 connected to the sensing signal lines $S_\alpha$, $P_\beta$, and Psd.

The sensing element Qp2 also has three terminals, i.e., a control terminal connected to the sensor scanning lines $S_\alpha$, an output terminal connected to the sensor data line $P_\beta$ and an input terminal connected to the input voltage line Psd. The sensing element Qp2 also includes a photoelectric material that generates a photocurrent upon receipt of light, and outputs a sensor output signal to the sensor data line $P_\beta$ in response to the sensor scanning signal from the sensor scanning line $S_\alpha$ under light. The sensing element Qp2 outputs a sensor output signal when the sensor scanning signal is higher than a predetermined voltage, and the predetermined voltage may be determined according to the operating range of the sensing element Qp2.

The configuration shown in FIG. 5B requires no control voltage line Psg shown in FIG. 5A.

The configurations shown in FIGS. 5A and 5B do not include one of the two-directional sensor data line and the sensing unit connected thereto shown in FIG. 3. Here, the sensor data signal from the sensing unit SU is used in the determination of the existence of a touch, and the sensor data signal from the photosensor PS1 and PS2 is used in the determination of the position of the touch.

Referring to FIG. 1 and FIG. 3 again, the gray voltage generator 550 generates a full number of gray voltages or a limited number of gray voltages (referred to hereinafter as "reference gray voltages") related to a transmittance of the pixels. Some of the (reference) gray voltages have a positive polarity with respect to the common voltage Vcom, while the other (reference) gray voltages have a negative polarity with respect to the common voltage Vcom.

The image scanning driver 400 is connected to the image scanning lines $G_1$-$G_n$ of the LC panel assembly 300 and synthesizes a gate-on voltage and a gate-off voltage to generate the image scanning signals for application to the image scanning lines $G_1$-$G_n$.

The image data driver 500 is connected to the image data lines $D_1$-$D_m$ of the LC panel assembly 300 and applies image data signals, which are selected from the gray voltages supplied from the gray voltage generator 550, to the image data lines $D_1$-$D_m$. However, if the gray voltage generator 550 supplies a limited number of reference gray voltages instead of all of the gray voltages, the image data driver 500 divides the reference gray voltages to generate the image data signals.

The sensing signal processor 800 is connected to the sensor data lines $SY_1$-$SY_N$ and $SX_1$-$SX_M$ of the panel assembly 300, receives the sensor data signals outputted from the sensor data lines $SY_1$-$SY_N$ and $SX_1$-$SX_M$, and for example amplifies and filters the sensor data signals, and analog-to-digital converts the sensor data signals to generate digital sensor data signals DSN. The sensing signal processor 800 generates a wakeup signal WU using the generated digital sensor data signals DSN.

The touch-determination unit 700 receives and processes the digital sensor data signals DSN from the sensing signal processor 800 to determine whether and where a touch exists. The touch-determination unit 700 then outputs touch determination information INF and an interrupt signal INTR to an external device, and outputs a standby signal SD to the sensing signal processor 800. The touch-determination unit 700 may monitor the operating condition of the sensing unit SU and the photosensors PS1 and PS2 to control the signals applied thereto. Also, the touch-determination unit 700 may determine intensity of external light based on the digital sensor data signals DSN related to the photosensors PS1 and PS2 to control a backlight (not shown) of the LCD.

The signal controller 600 controls the image scanning driver 400, the image data driver 500, the gray voltage generator 550 and the sensing signal processor 800, etc.

Each of the processing units 400, 500, 550, 600, 700 and 800 may include at least one integrated circuit ("IC") chip mounted on the LC panel assembly 300, on a flexible printed circuit ("FPC") film in a tape carrier package ("TCP") type, or on a separate printed circuit board ("PCB"), which are attached to the LC panel assembly 300. Alternatively, at least one of the processing units 400, 500, 550, 600, 700 and 800 may be integrated into the LC panel assembly 300 along with the signal lines $G_1$-$G_n$, $D_1$-$D_m$, $SY_1$-$SY_N$, and $SX_1$-$SX_M$, the thin film transistor Q, etc. Alternatively, all of the processing units 400, 500, 550, 600, 700 and 800 may be integrated into a single IC chip, but at least one of them or at least one circuit element in at least one of them may be disposed outside of the single IC chip.

The LCD including the photosensor PS1 or PS2 further includes a sensor scanning driver (not shown) connected to the sensor scanning line $S_\alpha$ to supply the sensor scanning signal to the sensor scanning line $S_\alpha$. In application of the photosensor PS1, the gate-on voltage and the gate-off voltage are synthesized to generate the sensor scanning signal, while in application of the photosensor PS2, the sensor scanning signal includes a high voltage for generating a photocurrent and a low voltage for not generating the photocurrent depending on the operating range of the sensing element Qp2.

Now, the display operation and the sensing operation of the above-described LCD will be described in further detail below.

The signal controller 600 is supplied with input image signals R, G and B and input control signals for controlling the display thereof from an external device (not shown). The input image signals R, G and B include luminance information of each pixel PX, and have a predetermined number of gray scales such as 1024 ($=2^{10}$), 256 ($=2^8$), or 64 ($=\square 2^6$). The input control signals include a vertical synchronization signal Vsync, a row synchronization signal Hsync, a main clock signal MCLK and a data enable signal DE, for example.

On the basis of input image signals R, G and B and the input control signals, the signal controller 600 processes the input image signals R, G and B to be suitable for the operation of the LC panel assembly 300 and the image data driver 500, and generates an image scanning control signal CONT1, an image data control signal CONT2, a sensor data control signal CONT3, etc. The signal controller 600 then sends the scanning control signals CONT1 to the image scanning driver 400, the image data control signal CONT2 and the processed image signals DAT to the image data driver 500, and the sensor data control signal CONT3 (see FIG. 3) to the sensing signal processor 800.

The image scanning control signals CONT1 include an image scanning start signal STV for instructing to start image scanning and at least one clock signal for controlling the output time of the gate-on voltage Von. The image scanning control signals CONT1 may include an output enable signal OE for defining the duration of the gate-on voltage Von.

The image data control signals CONT2 include a row synchronization start signal STH for informing of a start of image data DAT transmission for a group of pixels PX, a load signal LOAD for instructing to apply the image data signals to the image data lines $D_1$-$D_m$, and a data clock signal HCLK. The image data control signal CONT2 may further include an inversion signal RVS for reversing the voltage polarity of the image data signals with respect to the common voltage Vcom (referred to hereinafter as "image data signal polarity").

Responsive to the image data control signals CONT2 from the signal controller 600, the image data driver 500 receives a packet of the digital image signals DAT for the group of pixels PX, converts the digital image signals DAT into analog image data signals by selecting a gray voltage corresponding to each digital image signal DAT, and applies the analog image data signals to the image data lines $D_1$-$D_m$.

The image scanning driver 400 applies the gate-on voltage Von to an image scanning line $G_1$-$G_n$ in response to the image scanning control signals CONT1 from the signal controller 600, thereby turning on the switching transistors Q connected thereto. The image data signals applied to the image data lines $D_1$-$D_m$ are then supplied to the pixels PX through the activated switching transistors Q.

The difference between the voltage of an image data signal and the common voltage Vcom is represented as a voltage across the LC capacitor Clc, which is referred to as a pixel voltage. The LC molecules in the LC capacitor Clc have orientations depending on the magnitude of the pixel voltage, and the molecular orientations determine the polarization of light passing through the LC layer 3. The polarizer(s) converts light polarization into light transmittance to display images.

By repeating this procedure by a unit of a row period (also referred to as "1H" and equal to one period of the row synchronization signal Hsync and the data enable signal DE), all image scanning lines $G_1$-$G_n$ are sequentially supplied with the gate-on voltage, thereby applying the image data signals to all of the pixels PX to display an image for a frame.

When the next frame starts after one frame finishes, the inversion control signal RVS applied to the data driver 500 is controlled such that the polarity of the image data signals is reversed (which is referred to as "frame inversion"). The inversion control signal RVS may also be controlled such that the polarity of the image data signals flowing in a data line is periodically reversed during one frame (for example, row inversion and dot inversion), or the polarity of the image data signals in one packet is reversed (for example, column inversion and dot inversion).

The sensing signal processor 800 reads the sensor data signals flowing in the sensor data line $SY_1$-$SY_N$ and $SX_1$-$SX_M$ in a porch period between one frame and the next frame once a frame responds to the sensing control signals CONT3. In the porch period, the sensor data signals are influenced little by the driving signal from the image scanning driver 400, the image data driver 500, etc., and accordingly the sensor data signal may have high reliability. The sensor data signal may be read once for a plurality of frames.

The sensing signal processor 800 processes, for example, amplifies and filters the read sensor data signals and converts the analog sensor data signals into digital sensor data signals DSN to be sent to the touch-determination unit 700.

The touch-determination unit 700 receives the digital sensor data signals DSN, appropriately processes the received digital sensor data signals DSN to determine whether and where the touch exists, and sends the touch information to an external device. The external device generates image signals R, G and B based on the touch information and sends the image signals R, G and B to the LCD.

In application of the photosensor PS1 or PS2, the sensor scanning driver supplies the gate-on voltage to the sensor scanning line $S\alpha$ to turn on the switching element Qs connected thereto. The sensor data signal from the sensing element Qp1 is applied to the individual sensor data line $P_\beta$ through the turned on switching element Qs. However, the sensor scanning driver may supply a high voltage to the sensor scanning line $S\alpha$, and accordingly the sensing element Qp2 connected to the sensor scanning line $S\alpha$ may send the photocurrent as the sensor data signal to the individual sensor data line $P_\beta$.

Here, the sensing signal processor 800 reads the sensor data signals flowing in the sensor data line $P_\beta$ processes, for example, amplifies and filters the read sensor data signals, and converts the analog sensor data signals into digital sensor data signals DSN to be sent to the touch-determination unit 700.

By repeating this procedure by a unit of one or more row periods according to the resolution of the photosensor PS1 and PS2, the gate-on voltage or the high voltage is sequentially applied to all the sensor scanning lines $S\alpha$ the sensor data signals from the photosensor PS1 and PS2 are processed, and then the digital sensor data signals DSN are generated.

Now, the sensing signal processor 800 and the touch-determination unit 700 according to an exemplary embodiment of the present invention will be described in further detail with reference to FIG. 6 and FIG. 7.

Figure 6:
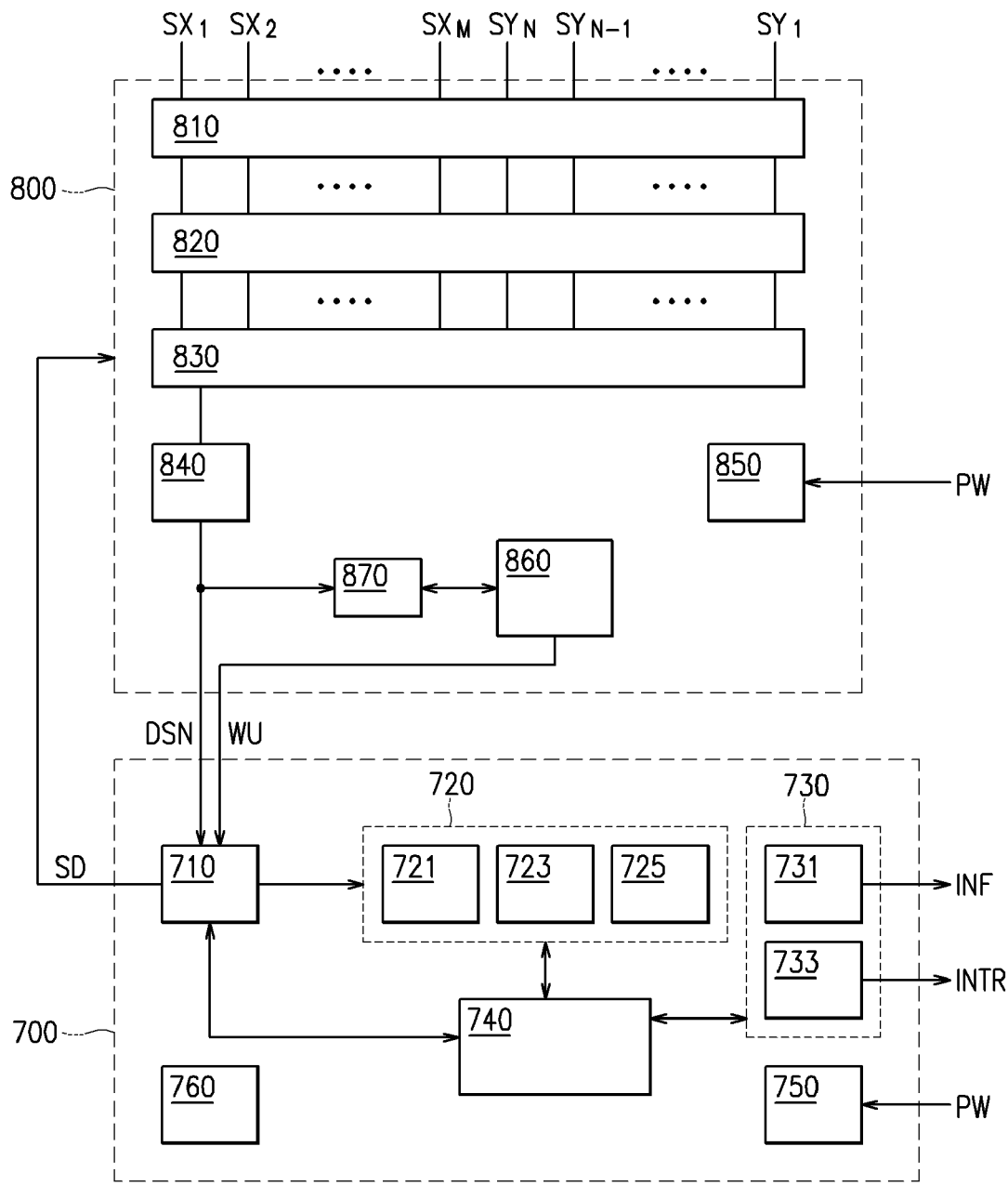
FIG. 6 is a block diagram for a sensor signal processor and a touch-determination unit of an LCD according to an exemplary embodiment of the present invention.

FIG. 6 is a block diagram for a sensor signal processor 800 and a touch-determination unit 700 of an LCD according to an exemplary embodiment of the present invention. FIG. 7 is a block diagram for a wake-up signal generator of an LCD according to an exemplary embodiment of the present invention.

Referring to FIG. 6, the sensing signal processor 800 includes an amplifying unit 810, a sample maintaining unit 820, a parallel-to-serial converter 830, an analog-to-digital converter 840, a frame memory 870, a wake-up signal generator 860 and a power unit 850.

The amplifying unit 810 is connected to the sensor data lines $SX_1$-$SX_M$ and $SY_1$-$SY_N$, and amplifies and filters the sensor data signals received therefrom.

The sample maintaining unit 820 receives the amplified sensor data signals from the amplifying unit 810 and samples and maintains the amplified sensor data signals.

The parallel-to-serial converter 830 receives the sampled sensor data signals inputted in parallel from the sample maintaining unit 820, converts the inputted signals into serial signals, and outputs the serial signals in turn.

The analog-to-digital converter 840 converts the serial signals from the parallel-to-serial converter 830 into digital signals to generate digital sensor data signals DSN, and outputs the digital sensor data signals DNS to the frame memory 870 and the touch-determination unit 700.

The frame memory 870 receives the digital sensor data signals DNS from the analog-to-digital converter 840, and stores the digital sensor data signals DNS for a plurality of frames.

The wake-up signal generator 860 reads the digital sensor data signals DNS for the plurality of frames from the frame memory 870 to determine whether a touch exists, generates a wake-up signal WU according to the determination, and outputs the wake-up signal WU to the touch-determination unit 700. The wake-up signal WU may be used in the sensing signal processor 800. The wake-up signal generator 860 may determine the existence of a touch based on the digital sensor data signal DSN for the whole of the sensor data lines $SY_1$-$SY_N$ and $SX_1$-$SX_M$, while the wake-up signal generator 860 may detect the touch based on the digital sensor data signal DSN for some of the data lines $SY_1$-$SY_N$ and $SX_1$-$SX_M$.

The wake-up signal generator 860 is physically separated from the other driving blocks 810, 820, 830, 840, 850 and 870 in the sensing signal processor 800, and performs independently therefrom. The wake-up signal generator 860 may be a hardwired logic unit, and includes a plurality of ICs connected to each other. The touch determination is performed by the ICs and connection thereof to each other. One example of the hardwired logic unit for processing a digital sensor data signal DSN for a plurality of frames from a sensor data line is shown in FIG. 7. The number of hardwired logic units included in the wake-up signal generator 860 may be equal to the number of sensor data lines to be processed for touch determination.

Figure 7:
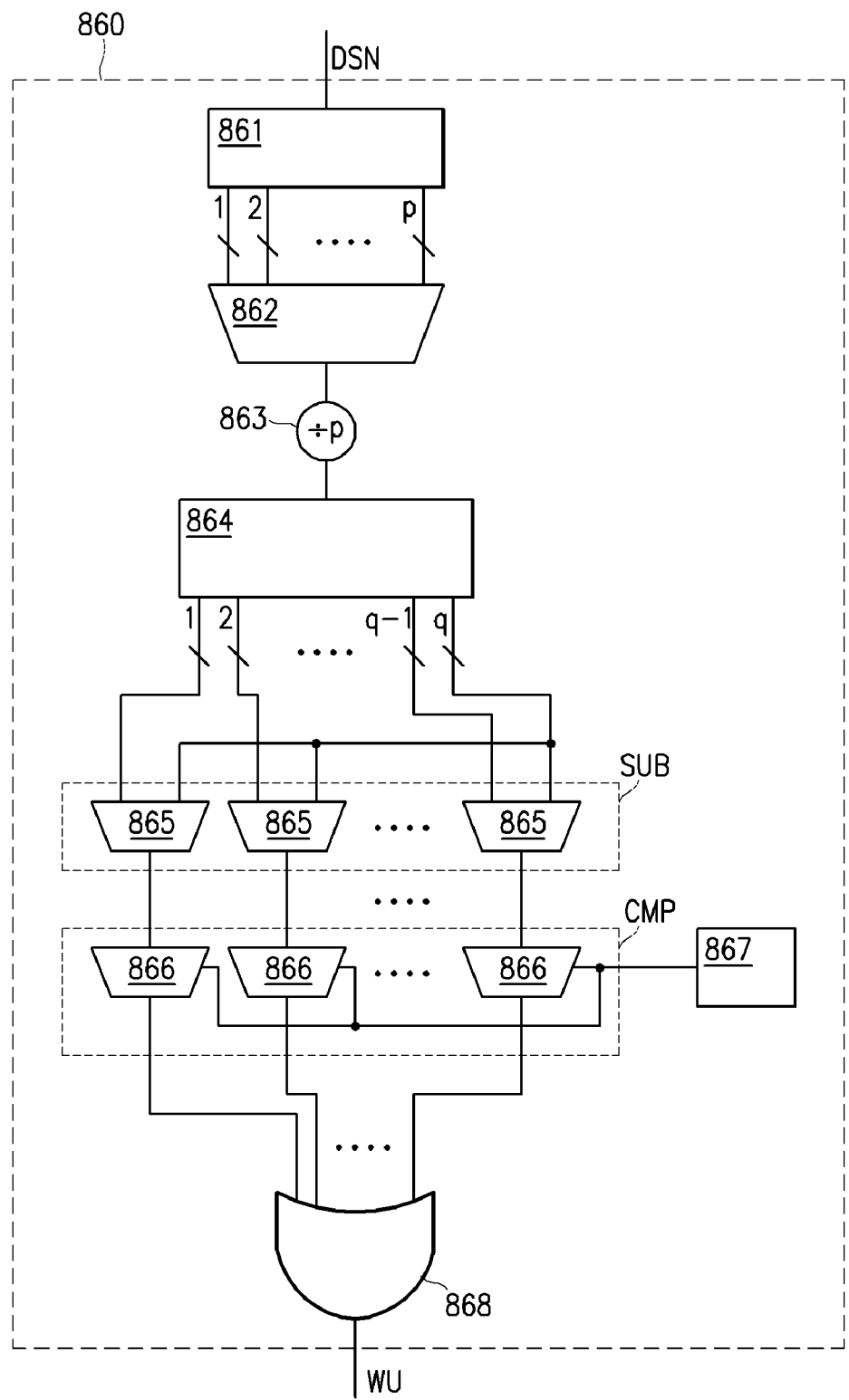
FIG. 7 is a block diagram for a wake-up signal generator of an LCD according to an exemplary embodiment of the present invention.

Referring to FIG. 7, the wake-up signal generator 860 includes a first shift register 861, an adder 862, a divider 863, a second shift register 864, a subtracter block SUB, a comparator block CMP, a reference register 867 and an OR gate 868.

The first shift register 861 stores digital sensor data signals DSN from the frame memory 870, and the first shift register 861 shifts once every frame to store a number (p) of digital sensor data signals DSN. Accordingly, the first shift register 861 stores the digital sensor data signals DSN for the latest p frames. The adder 862 sums the p digital sensor data signals DSN for p frames from the first shift register 861. The divider 863 divides the sum of the p digital sensor data signals DSN by the number p. The combination of the first shift register 861, the adder 862 and the divider 863 may serve as a smoothing filter, and accordingly the combination averages the p digital sensor data signals DSN of p frames to digitally filter the digital sensor data signals DSN. Noise components included in the digital sensor data signals DSN may be removed by the digital filtering as described above. Hereinafter, a digitally-filtered signal is referred as a filtered signal.

The second shift register 864 receives and stores the filtered signals, and here the second shift register 864 shifts once every frame to store q filtered signals. Here, the q-th filtered signal corresponds to the filtered signal for the current frame.

The subtracter block SUB includes a number (q−1) of subtracters 865. Each subtracter 865 has two input terminals, wherein one terminal is connected to the q-th filtered signal and the other terminal is connected to the (q−1)th filtered signal. The subtracter 865 outputs a difference signal, which is a subtraction of the first to q−1th filtered signals from the q-th filtered signal.

The comparator block CMP includes a plurality of comparators 866. Each comparator 866 is connected to an individual subtracter 865 and the reference register 867. The comparator 866 compares the difference signal from the subtracter 865 with a reference signal from the reference register 867. When the difference signal is greater than the reference signal, the comparator 866 outputs a wake-up signal WU. The wake-up signals WU from the comparators 866 are transmitted to the touch-determination unit 700 through the OR gate 868.

In the meantime, the level of the sensor data signals may be non-uniform due to degradation of the sensing units SU themselves and sensing conditions. Accordingly, a base level of the sensor data signals in the absence of a touch may be varied, and thus the touch determination based only on the current filtered signals may cause an error. However, the touch status may be correctly determined based on the difference signal, which is the subtraction of the previous filtered signals from the current filtered signal.

The hardwired logic unit is but one example, and other hardwired logic units may be applied for determining the touch, and many variations may be performed for other exemplary embodiment of the logic units.

Referring to FIG. 6 again, the power unit 850 is supplied with an external power PW to supply the power PW to each driving block 810-840, 860 and 870. The power unit 850 cuts off the power PW supply for the amplifying unit 810, the sample maintaining unit 820, the parallel-to-serial converter 830, and the analog-to-digital converter 840 in response to a standby signal SD (see FIG. 3). The cutoff of the power PW may be limited to a portion of the amplifying unit 810, the sample maintaining unit 820, the parallel-to-serial converter 830 and the analog-to-digital converter 840, and may be limited to a time for a part of one frame. The power unit 850 cuts off the power PW to the wake-up signal generator 860 in response to the wake-up signal WU, while the power unit 850 supplies the power PW to the wake-up signal generator 860 in response to the standby signal SD.

Referring to FIG. 6, the touch-determination unit 700 includes an input-output interface 710, a memory unit 720, a peripheral input-output unit 730, a main processor 740, a power unit 750 and a clock generator 760.

The input-output interface 710 receives the digital sensor data signal DSN and the wake-up signal WU from the sensing signal processor 800 and outputs the standby signal SD to the sensing signal processor 800.

The memory unit 720 includes a first, a second and a third memory 721, 723 and 725, respectively. The first memory 721 may include a nonvolatile memory such as a flash memory, and it stores program codes executed by the main processor 740. The second memory 723 is a kind of register, it may include a static RAM, and it stores several parameters used in the touch-determination unit 700. The third memory 725 may include a static RAM, and it receives and stores the digital sensor data signals DSN from the input-output interface 710.

The peripheral input-output unit 730 includes a serial communication unit 731 and an interrupt processor 733. The serial communication unit 731 may include a serial peripheral interface ("SPI") or an inter-integrated circuit ("I$^2$C"). The serial communication unit 731 outputs the touch information INF to an external device, and it may output signals for controlling the signals supplied to the sensing unit SU and photosensors PS1 or PS2. The interrupt processor 733 may include a general purpose input-output ("GPIO"), and it outputs the interrupt signal INTR to an external device. The interrupt signal INTR includes a touch interrupt, a backlight brightness interrupt, etc.

The main processor 740 may include a central processing unit ("CPU") or a micro processing unit ("MPU"), etc., and it operates in response to the program codes from the memory unit 720. The main processor 740 determines whether and where a touch exists based on the digital sensor data signal DSN, generates the standby signal SD and the touch information INF, and inspects the operation of the sensing units SU and the photosensors PS1 or PS2 to control the signals supplied thereto. Also, the main processor 740 controls the luminance of the backlight.

The clock generator 760 receives a main clock signal MCLK from an external device, and modulates, e.g., raises or lowers the frequency of the clock signal MCLK to generate a clock signal used in the touch-determination unit 700. In the case of raising the clock frequency, the clock generator 760 may include a phase-locked loop ("PLL") circuit (not shown), which synchronizes the phases of signals and is used in generating high frequency clock signals. Otherwise, the touch-determination unit 700 uses the main clock signal MCLK as it is.

The power unit 750 is supplied with an external power PW to supply the power PW to each driving block 710-740 and 760, and cuts off the power PW to the main processor 740, the first memory 721, the serial communication unit 731, the PLL circuit, etc., depending on the operation mode.

Now, a driving method of an LCD according to an exemplary embodiment of the present invention will be described in further detail with reference to FIG. 8.

Figure 8:
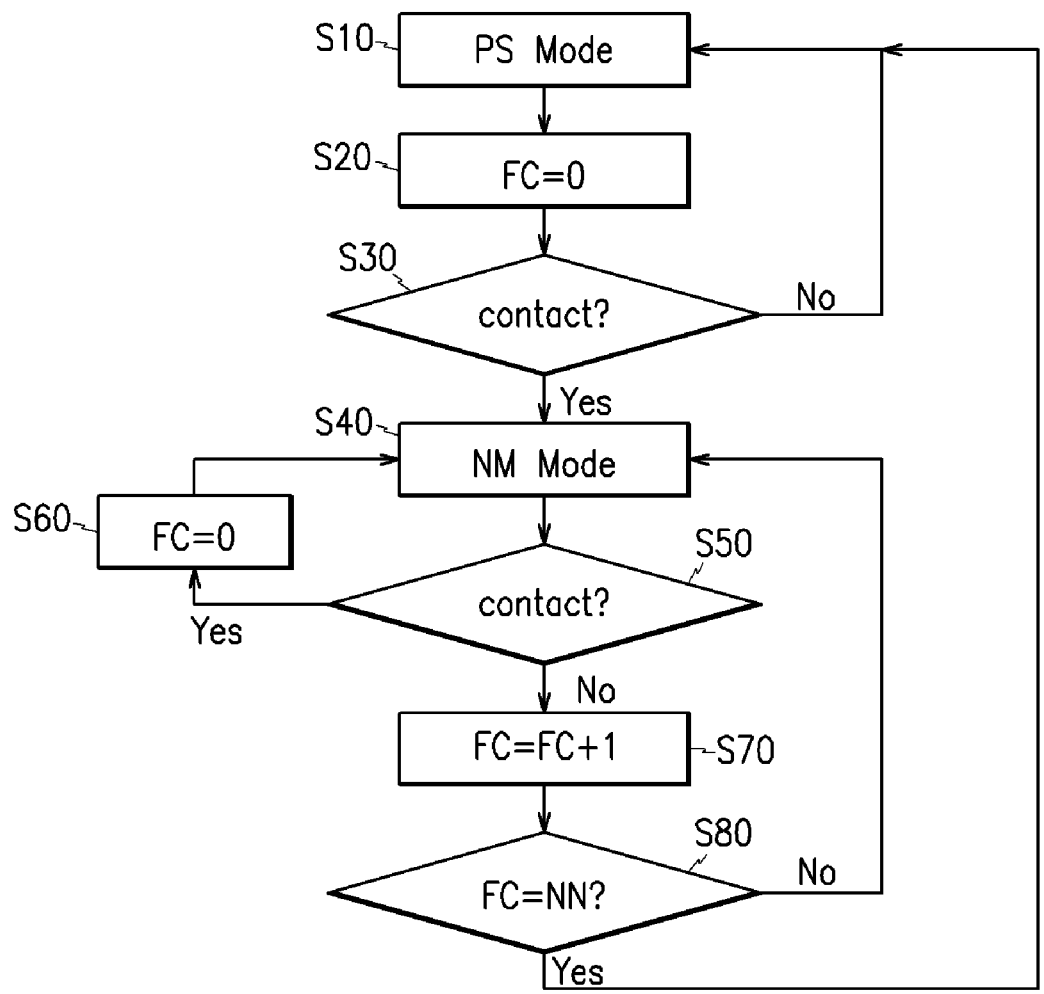
FIG. 8 is a flowchart representing a driving method of an LCD according to an exemplary embodiment of the present invention.

FIG. 8 is a flowchart illustrating a driving method of an LCD according to an exemplary embodiment of the present invention.

The sensing signal processor 800 and the touch-determination unit 700 operate in two modes, e.g., a normal mode NM and a power saving mode PS. The wake-up signal WU and the standby signal SD determine whether the sensing signal processor 800 and the touch-determination unit 700 operate in the normal mode NM or in the power saving mode PS.

Referring to FIG. 8, the sensing signal processor 800 and the touch-determination unit 700 begin their operations in the power saving mode PS (S10).

In the power saving mode PS, the power is supplied to minimal portions of the sensing signal processor 800 for sensing a touch, while the other driving portions are cut off from the power. For example, the portions, connected to the sensor data lines $P_\beta$, of the amplifier 810, of the sample maintaining unit 820, of the parallel-to-serial converter 830, and of the analog-to-digital converter 840 are cut off from the power. Portions connected to either the row sensor data lines $SY_1$-$SY_N$ or the column sensor data lines $SX_1$-$SX_M$ are supplied with the power, while portions connected to the other are cut off from the power. Otherwise, portions connected to either even or odd numbered sensor data lines may be supplied with the power. However, the frame memory 870 and the wake-up signal generator 860 are still supplied with the power to detect touch or contact.

Also, in the power saving mode PS, the main processor 740, the first memory 721, the serial communication unit 731 and the PLL circuit (not shown) are cut off from the power.

As described above, in the power saving mode PS, the power is supplied to minimal portions to detect touch or contact and is cut off from most of the sensing signal processor 800 and the touch-determination unit 700 to reduce power consumption.

Next, the frame counter FC is initialized to "0" zero (S20). The frame counter FC is a variable for calculating the number of frames, and is included in a condition required for converting from the normal mode NM to the power saving mode PS.

The wake-up signal generator 860 determines whether a touch or contact exists in the power saving mode PS (S30). When the wake-up signal generator 860 determines that there is no touch or contact, the wake-up signal generator 860 deactivates the wake-up signal WU, e.g., keeps the wake-up signal WU set to "0," which is output to the sensing signal processor 800 and the touch-determination unit 700. Accordingly, the sensing signal processor 800 and the touch-determination unit 700 are maintained in the power saving mode PS, and steps S10 to S30 are repeated to continuously check for touch or contact.

When the wake-up signal generator 860 determines that a touch or contact exists, the wake-up signal generator 860 activates the wake-up signal WU, e.g., changes the value of the wake-up signal WU to "1." Accordingly, the operation mode is changed to the normal mode NM (S40).

In the normal mode NM, all function blocks of the sensing signal processor 800 and the touch-determination unit 700 except for the wake-up signal generator 860 are supplied with the power, so that the sensing signal processor 800 and the touch-determination unit 700 operate normally. The sensing signal processor 800 receives sensor data signals from the sensor data lines $SX_1$-$SX_M$, $SY_1$-$SY_N$, and $P_\beta$ and converts the received sensor data signals to digital sensor data signals DSN. The touch-determination unit 700 determines whether and where a touch exists based on the digital sensor data signals DSN. However, in the normal mode NM, the wake-up signal generator 860 is cut off from the power. The sensing signal processor 800 may be cut off from the power for most of the time for each frame, except for a time when receiving and processing the sensor data signals.

In the normal mode NM, the touch-determination unit 700 determines whether a touch or contact exists (S50).

In step S50, when the touch-determination unit 700 determines that a touch or contact exists, the touch-determination unit 700 initializes the frame counter FC to "0" zero (S60), and then the normal mode NM is maintained (S40) to continuously determine whether and where a touch or contact exists. Here, the touch-determination unit 700 deactivates the standby signal SD, e.g., sets the standby signal SD to "0," which is sent to the sensing signal processor 800.

In step S50, when the touch-determination unit 700 determines that there is no touch or contact, the value of the frame counter FC is added by one (S70). Next, the value of the frame counter FC is compared with a predetermined value NN (S80). When the value of the frame counter FC is not equal to the predetermined value NN, the normal mode NM is maintained (S40). When the value of the frame counter FC is equal to the predetermined value NN, the standby signal SD is activated, e.g., changed to "1," and the operation mode is changed to the power saving mode PS (S10). Here, the predetermined value NN is a natural number.

In short, when a touch or contact is detected in the power saving mode PS, the operation mode is converted to the normal mode NM, and when no touch is detected for a predetermined time in the normal mode NM, the operation mode is again converted to the power saving mode PS. As described above, the operation mode is the power saving mode PS when no touch or contact exists thus reducing power consumption.

Now, a driving device of an LCD according to another exemplary embodiment of the present invention will be described in further detail with reference to FIG. 9.

Figure 9:
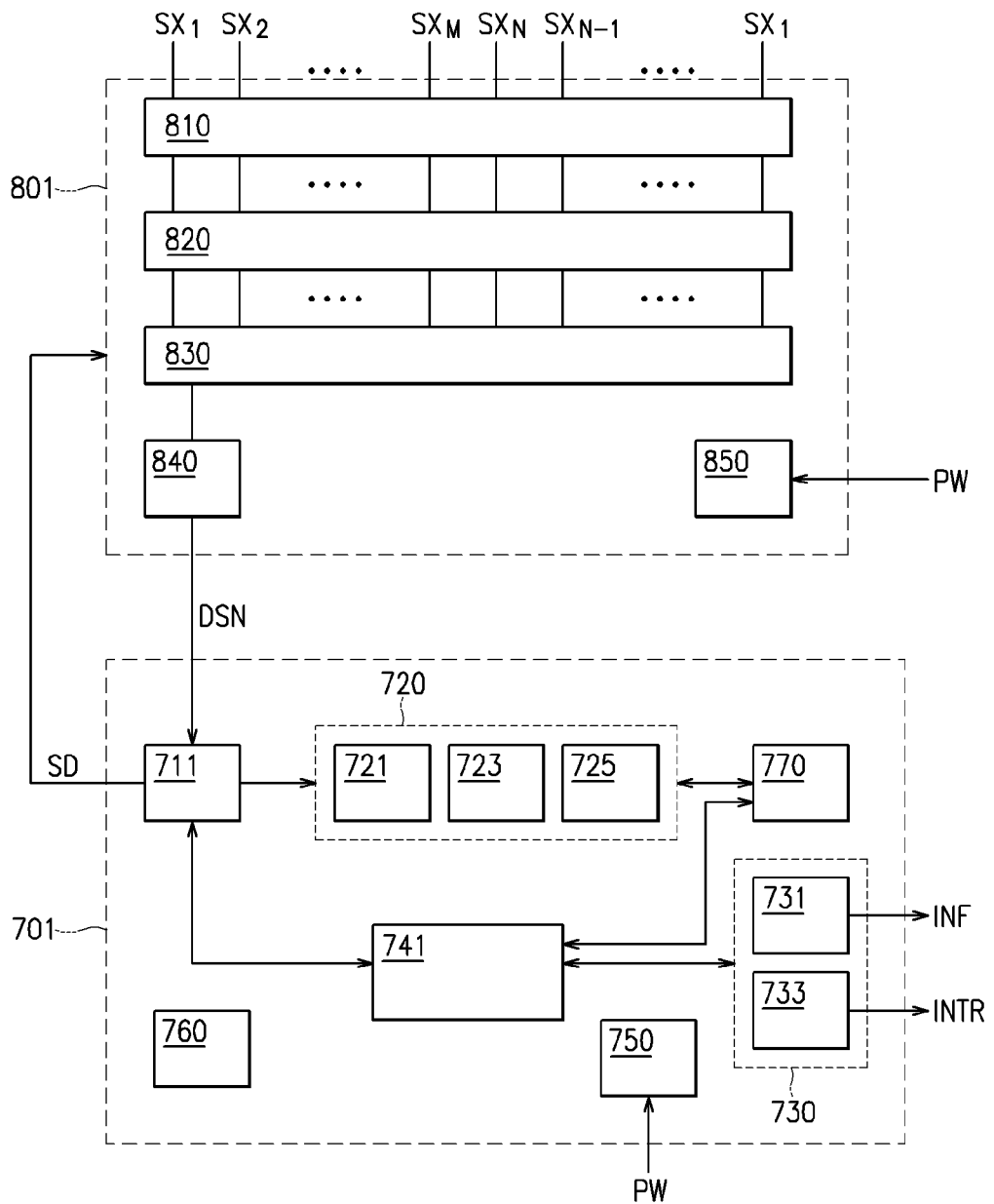
FIG. 9 is a block diagram for a sensor signal processor and a touch-determination unit of an LCD according to another exemplary embodiment of the present invention.

FIG. 9 is a block diagram for a sensor signal processor 801 and a touch-determination unit 701 of an LCD according to another exemplary embodiment of the present invention.

Referring to FIG. 9, the sensing signal processor 801 includes an amplifying unit 810, a sample maintaining unit 820, a parallel-to-serial converter 830 and an analog-to-digital converter 840, which are sequentially connected, and a power unit 850. The sensing signal processor 801 according to the present exemplary embodiment is substantially the same as the sensing signal processor 800 described in the previous exemplary embodiment, except for the frame memory 870 and the wake-up signal generator 860, therefore a detailed description thereof is omitted.

The touch-determination unit 701 includes an input-output interface 711, a memory unit 720, a peripheral input-output unit 730, a main processor 741, a power unit 750, a clock generator 760 and a wake-up signal generator 770. The touch-determination unit 701 according to the present exemplary embodiment is substantially same as the touch-determination unit of the previous embodiment, therefore only differences therebetween are described and detailed descriptions of portions that are the same are omitted.

The wake-up signal generator 770 reads digital sensor data signals DSN for a plurality of frames from the third memory 725 to determine whether a touch exists, generates a wake-up signal WU based on the determination, and outputs the wake-up signal WU to the main processor 741. The wake-up signal generator 770 may be a hardwired logic unit shown in FIG. 7, and is substantially the same as the wake-up signal generator 860 of the previous exemplary embodiment. The wake-up signal generator 770 operates in the power saving mode PS, and is cut off from the power in the normal mode NM such that the wake-up signal generator 770 stops its operation.

The input-output interface 711 receives the digital sensor data signal DSN from the sensing signal processor 801, and outputs the standby signal SD to the sensing signal processor 800.

The power unit 750 supplies the power to the main processor 741, the first memory 721, the serial communication unit 731, the PLL circuit (not shown), etc., and cuts off the power from the wake-up signal generator 770 in response to the wake-up signal WU from the wake-up signal generator 770.

The main processor 741 is enabled to start its operation by the wake-up signal WU.

The operation mode of the sensing signal processor 801 and the touch-determination unit 701 is divided into the power saving mode PS and the normal mode NM as shown in FIG. 8, and the operation of the sensing signal processor 801 and the touch-determination unit 701 according to the present exemplary embodiment is substantially the same as that of the previous exemplary embodiment, thus a detailed description thereof is omitted.

The sensing signal processor 801 and the touch-determination unit 701 may be built in a single IC.

The above-described exemplary embodiments can also be applied to other flat panel display devices such as a plasma display device, an organic light emitting diode ("OLED") display, a field emission display, etc.

Although exemplary embodiments of the present invention have been described in hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A display device comprising:
a display panel;
a plurality of pixels formed on the display panel;
a plurality of sensing units formed on the display panel and generating sensor output signals in response to a touch exerted on the display panel;
a sensing signal processor receiving and processing an analog sensor data signal originated from the sensor output signals to generate a digital sensor data signal;
a first touch-determination unit detecting whether a touch exists based on the digital sensor data signal for a plurality of frames, and operating in a power saving mode; and
a second touch-determination unit detecting whether and where a touch exists based on the digital sensor data signal for the plurality of frames, and operating in a normal mode.

2. The display device of claim 1, wherein the first touch-determination unit comprises hardwired logic units.

3. The display device of claim 1, wherein the first touch-determination unit is cut off from a power in the normal mode.

4. The display device of claim 1, wherein the first touch-determination unit comprises:
an averaging unit averaging the digital sensor data signal for the plurality of frames;
a difference data generator generating a difference data based on the averaged digital sensor data signal; and
a comparator comparing the difference data with a reference data.

5. The display device of claim 4, wherein it is determined that a touch occurs when the difference data is equal to or greater than the reference data.

6. The display device of claim 1, wherein the second touch-determination unit comprises:
a first memory storing program codes;
a second memory storing the digital sensor data signal for the plurality of frames; and
a main processor operating based on the program codes read from the first memory, reading the digital sensor data signal for the plurality of frames from the second memory, and determining whether and where the touch exists based on the read digital sensor data signal.

7. The display device of claim 6, wherein the first memory and the main processor are cut off from a power in the power saving mode.

8. The display device of claim 1, wherein the sensing signal processor comprises:
an amplifier amplifying the analog sensor data signal; and
an analog-to-digital converter converting the amplified analog sensor data signal to generate the digital sensor data signal.

9. The display device of claim 8, wherein the amplifier has a plurality of channels and at least one of the channels is cut off from the power in the power saving mode.

10. The display device of claim 1, further comprising a frame memory storing the digital sensor data signal for a plurality of frames.

11. The display device of claim 1, wherein the sensing signal processor comprises the first touch-determination unit and is implemented in a single IC.

12. The display device of claim 1, wherein the second touch-determination unit comprises the first touch-determination unit and is implemented in a single IC.

13. The display device of claim 1, wherein the sensing signal processor and the first and second touch-determination units are implemented in a single IC.

14. An apparatus for driving a display device including a display panel and a plurality of sensing units generating sensor output signals in response to a touch exerted on the display panel, the apparatus comprising:
a sensing signal processor receiving and processing an analog sensor data signal originated from the sensor output signals to generate a digital sensor data signal;
a first touch-determination unit detecting whether a touch exists based on the digital sensor data signal for a plurality of frames and operating in a power saving mode; and
a second touch-determination unit detecting whether and where a touch exists based on the digital sensor data signal for the plurality of frames and operating in a normal mode.

15. The apparatus of claim 14, wherein the first touch-determination unit comprises hardwired logic units.

16. The apparatus of claim 14, wherein the first touch-determination unit is cut off from a power in the normal mode.

17. The apparatus of claim 14, wherein the first touch-determination unit comprises:
an averaging unit averaging the digital sensor data signal for the plurality of frames;
a difference data generator generating difference data based on the averaged digital sensor data signal; and
a comparator comparing the difference data with reference data.

18. The apparatus of claim 17 wherein it is determined that a touch occurs when the difference data is equal to or greater than the reference data.

19. The apparatus of claim 14, wherein the second touch-determination unit comprises:
a first memory storing program codes;
a second memory storing the digital sensor data signal for the plurality of frames; and
a main processor for operating based on the program codes read from the first memory, reading the digital sensor data signal for the plurality of frames from the second memory, and determining whether and where the touch exists based on the read digital sensor data signal.

20. The apparatus of claim 19, wherein the first memory and the main processor are cut off from a power in the power saving mode.

21. The apparatus of claim 14, wherein the sensing signal processor comprises:
an amplifier amplifying the analog sensor data signal; and
an analog-to-digital converter analog-to-digital converting the amplified analog sensor data signal to a digital sensor data to generate the digital sensor data signal.

22. The apparatus of claim 21, wherein the amplifier has a plurality of channels, and at least one of the channels is cut off from the power in the power saving mode.

23. The apparatus of claim 14, further comprising a frame memory saving the digital sensor data signal for a plurality of frames.

24. The apparatus of claim 14, wherein the sensing signal processor comprises the first touch-determination unit and is implemented in a single IC.

25. The apparatus of claim 14, wherein the second touch-determination unit comprises the first touch-determination unit and is implemented in a single IC.

26. The apparatus of claim 14, wherein the sensing signal processor and the first and second touch-determination units are implemented in a single IC.

27. A method of driving a display device including a display panel, a plurality of sensing units generating sensor output signals in response to a touch exerted on the display panel, and first and second touch-determination units determining the existence of a touch based on the sensor output signals, the method comprising:
- generating a digital sensor data signal based on the sensor output signals;
- determining whether a touch exists based on the digital sensor data signal in the first touch-determination unit;
- cutting the first touch-determination unit off from a power and supplying the power to the second touch-determination unit when the first touch determination unit determines that a touch exists;
- determining whether a touch exists based on the digital sensor data signal in the second touch-determination unit; and
- supplying the power to the first touch-determination unit and cutting the second touch-determination unit off from the power after a predetermined time when the second touch determination unit determines that there is no touch.

28. The method of claim 27, wherein
the determination in the first and second touch determination units comprise:
- averaging the digital sensor data signal for the plurality of frames;
- generating a difference data based on the averaged digital sensor data signal;
- comparing the difference data with a reference data; and
- determining that a touch occurs when the difference data is equal to or greater than the reference data.

29. The method of claim 27, wherein the generation of the digital sensor data signal comprises:
- amplifying the sensor output signals, and
- analog-to-digital converting the amplified sensor output signals to generate the digital sensor data signal.

30. The method of claim 27, further comprising:
determining a position of a touch in the second touch-determination unit.

* * * * *